(12) United States Patent
Deshmukh et al.

(10) Patent No.: US 9,400,518 B2
(45) Date of Patent: Jul. 26, 2016

(54) TEMPORARY FREQUENCY ADJUSTMENT OF MOBILE DEVICE PROCESSORS BASED ON TASK MIGRATION

(71) Applicant: Qualcomm Innovation Center, Inc., San Diego, CA (US)

(72) Inventors: Varad Deshmukh, San Diego, CA (US); Stephen Muckle, San Diego, CA (US); Bryan Huntsman, San Diego, CA (US); Veena Sambasivan, San Diego, CA (US); Srivatsa Vaddagiri, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 322 days.

(21) Appl. No.: 14/051,103

(22) Filed: Oct. 10, 2013

(65) Prior Publication Data

US 2014/0365808 A1 Dec. 11, 2014

Related U.S. Application Data

(60) Provisional application No. 61/831,518, filed on Jun. 5, 2013.

(51) Int. Cl.
*G06F 1/12* (2006.01)
*G06F 9/50* (2006.01)
*G06F 1/32* (2006.01)

(52) U.S. Cl.
CPC ........ *G06F 1/12* (2013.01); *G06F 1/324* (2013.01); *G06F 9/5088* (2013.01); *Y02B 60/1217* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 2011/0296212 A1* | 12/2011 | Elnozahy | .............. | G06F 1/3203 713/320 |
| 2012/0036375 A1* | 2/2012 | Puschini Pascual | .. | G06F 9/5027 713/300 |
| 2012/0284729 A1* | 11/2012 | Sharda | .................. | G06F 9/5094 718/104 |
| 2013/0013911 A1* | 1/2013 | Gustafsson | ........... | G06F 1/3203 713/100 |

\* cited by examiner

*Primary Examiner* — Kim Huynh
*Assistant Examiner* — Joshua Neveln
(74) *Attorney, Agent, or Firm* — Neugeboren O'Dowd PC

(57) ABSTRACT

Systems and methods for temporarily adjusting the frequency of processors are disclosed. A computing device may include a plurality of processors that are each configured to execute one or more tasks at a corresponding one of a plurality of frequencies. A scheduling component migrates tasks between the processors to balance a load that is processed by the plurality of processors. A governor component includes a frequency adjustment component to control a frequency of each of the processors and a frequency synchronization component that detects when the scheduling component is migrating one of the tasks from a source processor to a destination processor. The synchronization component increases, based upon a frequency of the source processor, a frequency of the destination processor.

14 Claims, 3 Drawing Sheets

TEMPORARY FREQUENCY ADJUSTMENT OF MOBILE DEVICE PROCESSORS BASED ON TASK MIGRATION

CLAIM OF PRIORITY UNDER 35 U.S.C. §119

The present Application for Patent claims priority to Provisional Application No. 61/831,518 entitled "TEMPORARY FREQUENCY ADJUSTMENT OF MOBILE DEVICE PROCESSORS BASED ON TASK MIGRATION" filed Jun. 5, 2013, and assigned to the assignee hereof and hereby expressly incorporated by reference herein.

BACKGROUND

1. Field

The present disclosed embodiments relate generally to computing devices, and more specifically to control of operating frequencies of processors.

2. Background

Computing devices including devices such as smartphones, tablet computers, gaming devices, and laptop computers are now ubiquitous. These communication devices are now capable of running a variety of applications (also referred to as "apps") and many of these devices include multiple processors to process tasks that are associated with apps. In many instances, multiple processors are integrated as a collection of processor cores within a single functional subsystem. It is known that the processing load on a mobile device may be apportioned to the multiple cores. As an example, for load balancing purposes, a processing task may be migrated from one core to another core. In many existing devices multiple cores operate at the same frequency; thus a particular task may be migrated from one core to another core without substantially affecting what the user experiences because the task is processed at the same frequency regardless of the core.

Other more sophisticated devices, however, have multiple core processors that may be operated asynchronously at different frequencies. On this type of device, the amount of work that is performed on each processor may be monitored and the frequency of each processor may be controlled accordingly. If a particular core has a heavy load, the frequency of that processing core may be increased. If a processing core has a relatively low load or is idle, the frequency of that core may be decreased (e.g., to reduce power consumption).

Problematically, existing operating systems (e.g., Linux) may migrate a task from a processing core that is operating at a relatively high frequency to a processing core that is operating at a relatively low frequency, and as a consequence, the execution of that task may be slowed, which from a user's perspective, may be experienced as "stuttering" or poor application performance.

SUMMARY

Aspects of the present invention may be characterized as a computing device that includes a plurality of processors configured to execute one of a plurality of tasks at a corresponding one of a plurality of frequencies. A scheduling component migrates tasks between the processors to balance a load that is processed by the plurality of processors. The computing device also includes a governor component, which includes a frequency adjustment component to control a frequency of each of the processors, and a frequency synchronization component that detects when the scheduling component is migrating one of the tasks from a source processor to a destination processor and increases, based upon a frequency of the source processor, a frequency of the destination processor from a frequency set by the frequency adjustment component.

Other aspects may be characterized as a method for operating a plurality of processors on a computing device. The method may include executing each of a plurality of tasks on a corresponding one of the plurality of processors at a corresponding one of a plurality of frequencies and adjusting a frequency of each of the plurality of processors based upon work that each of the plurality of processors is performing. When a particular task is migrated from a source processor to a destination processor in connection with load balancing, a frequency of the destination processor is increased if the frequency of the destination processor is below a frequency of the source processor.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
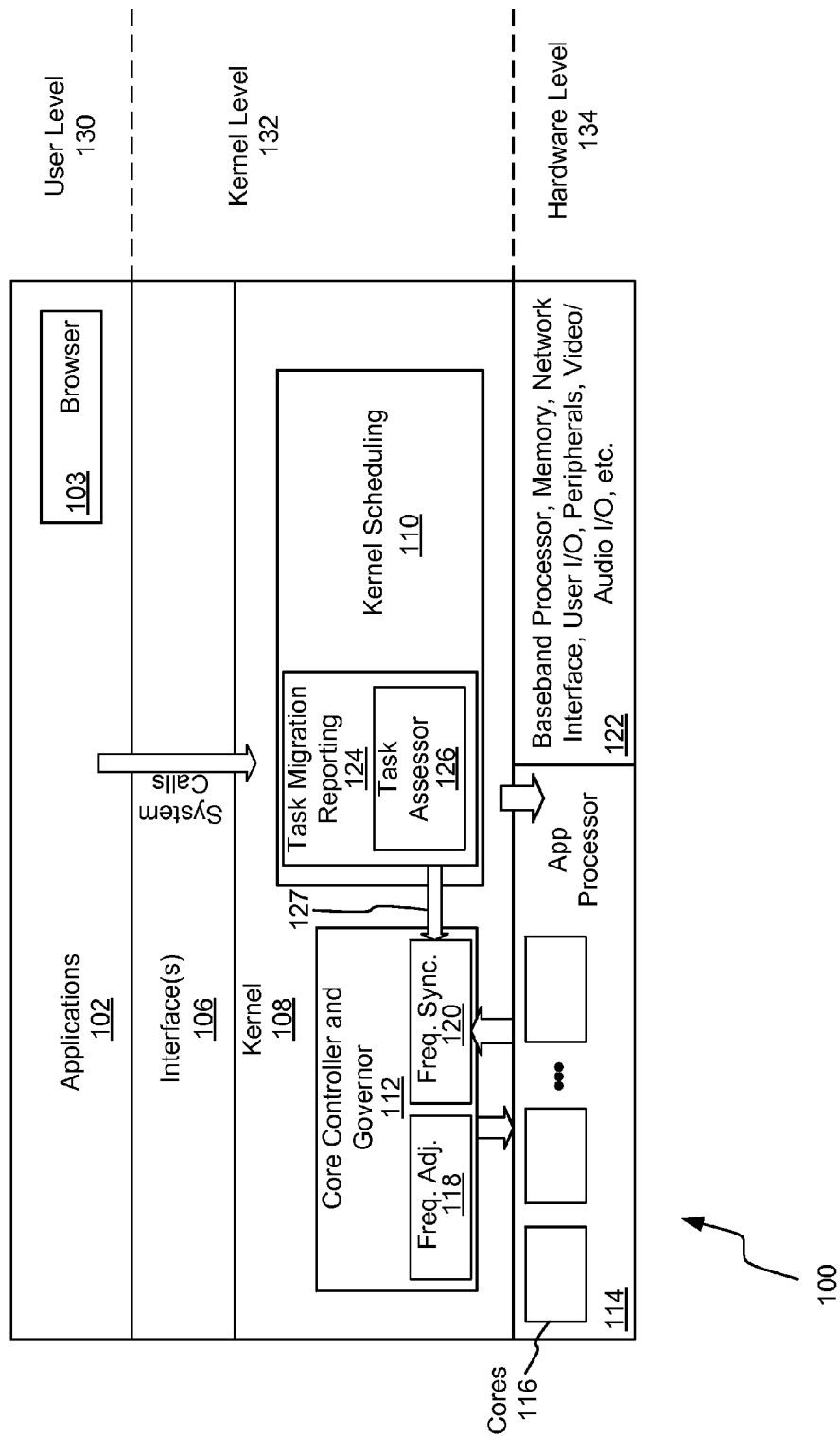
FIG. 1 is a block diagram illustrating components of a computing system.

Referring to FIG. 1, it is a block diagram illustrating components of a computing system 100 (also referred to herein as a computing device 100). The block diagram includes applications 102 (e.g., a web browser 103) at the highest level of abstraction and hardware such as the applications processor 114, which includes a plurality of processing cores 116, at the lowest level. The kernel 108 along with interface 106 enable communication between the applications 102 and the applications processor 114. In particular, the interface 106 passes system calls from the applications 102 to the kernel 108. The governor and core controller 112 (also referred to herein as the governor 112 or processor governor 112) generally operates to monitor a load on the app processor 114, and determines an operating frequency to operate the online processor cores 116. As depicted, the governor 112 includes a frequency adjustment component 118 and a novel frequency synchronization component 120. Although the specific embodiment depicted in FIG. 1 depicts multiple processor cores 116 within an app processor 114, it should be recognized that other embodiments include a plurality of processors that are not integrated within the app processor 114. As a consequence, the operation of multiple processors is described herein in the context of both multiple processor cores 116, and more generally, multiple processors, which may include processor cores and discrete processors.

The one or more applications 102 may be realized by a variety of applications that operate via, or run on, the app processor 114. For example, the one or more applications 102 may include a web browser 103 and associated plug-ins, entertainment applications (e.g., video games, video players), productivity applications (e.g., word processing, spread sheet, publishing applications, video editing, photo editing applications), core applications (e.g., phone, contacts), and augmented reality applications.

As one of ordinary skill in the art will appreciate, the user-space 130 and kernel-space 132 components depicted in FIG. 1 may be realized by hardware in connection with processor-executable code stored in a non-transitory tangible processor readable medium such as nonvolatile memory 122, and can be executed by app processor 114. Numerous variations on the embodiments herein disclosed are also possible. For instance, the governor of the core controller and governor 112 can be selected from the following non-exclusive list: interactive, smoothass, conservative, ondemand, userspace, powersave, performance, smartass, and always max.

In general, the frequency adjustment component 118 of the governor 112 operates to adjust the operating frequency of each of the processor cores 116 based upon the work that each processor core is performing. If a particular one of the processor cores 116 has a heavy load, the frequency adjustment component 118 of the governor 112 may increase a frequency of the particular processing core. If another processing core has a relatively low load or is idle, the frequency of that processor core may be decreased (e.g., to reduce power consumption). For instance, the governor 112 can periodically sample the app processor 114 load to determine whether to raise or lower the app processor 114 operating frequency. The frequency adjustment component 118 can then control the operating frequency of the processor cores 116. In many embodiments, this frequency control is carried out independently on each processor core, with each processor core scaling independently of the others.

Among other functions, the kernel scheduling component 110 (also referred to herein as a scheduling component 110) operates to migrate tasks between the processor cores 116 to balance the load that is being processed by the app processor 114. But unlike prior implementations, the exemplary embodiment includes a task migration reporting component 124 in the kernel scheduler 110 to provide migration information 127 to inform the governor 112 when a task is being migrated from one processor core to another processor core. And depending upon the relative operating frequencies of the processor cores, the frequency synchronization component 120 operates to adjust the frequency of the target processor core (also referred to herein as the destination processor core) while the kernel scheduling component 110 is migrating a task from one of the two cores to the target processor core.

More specifically, the frequency synchronization component 120 of the governor 112 compares the source processor frequency to the destination processor frequency, and if the source processor frequency is higher than the destination processor frequency, the destination processor frequency is increased to prevent potential performance loss. The governor 112 may run periodically to monitor the usage of each processor core, and when a task is migrated and a frequency adjustment is made, the next scheduled governor 112 timer callback is rescheduled to occur one full period in the future. This prevents the periodic governor 112 callback from running immediately after the destination processor frequency is artificially increased due to a migration and prevents the processor frequency from being reset to a frequency that is lower than would be desired. As used herein, the term synchronization does not require that the source processor frequency and the destination frequency be equal, and as discussed further herein, the frequency of the destination processor may be adjusted in a variety of ways.

As shown, in this embodiment the task migration reporting component 124 includes an optional task assessor 126 that controls whether the task migration reporting component 124 sends the migration information 127 to the governor 112. More specifically, the frequency of the destination processing core need not be increased for all types of tasks. Some tasks on the system, for example, may be executing background work or other non-critical processing. In the context of a LINUX operating system, control groups (cgroups) can be used to group tasks, and the ANDROID mobile platform uses this mechanism to create several task groups—one of which represents tasks relevant to foreground activity (e.g., that is perceptible to a user viewing content on a display of the computing system 100). To prevent excessive frequency adjustment of destination cores, the cgroup mechanism in LINUX may be modified to contain an additional attribute. This attribute specifies whether tasks in that cgroup should trigger this notification 127 to the governor 112. As a consequence, when a task in a cgroup with the notification attribute set (for example, this may be set for the foreground cgroup created by ANDROID) migrates from one processor core to another, and the destination processing core is running at a lower frequency that the source, the destination processor frequency will be increased (e.g., to be equal to that of the source processor). Because of this, the migrated task will be less likely to suffer a performance decrease when it resumes execution.

Figure 2:
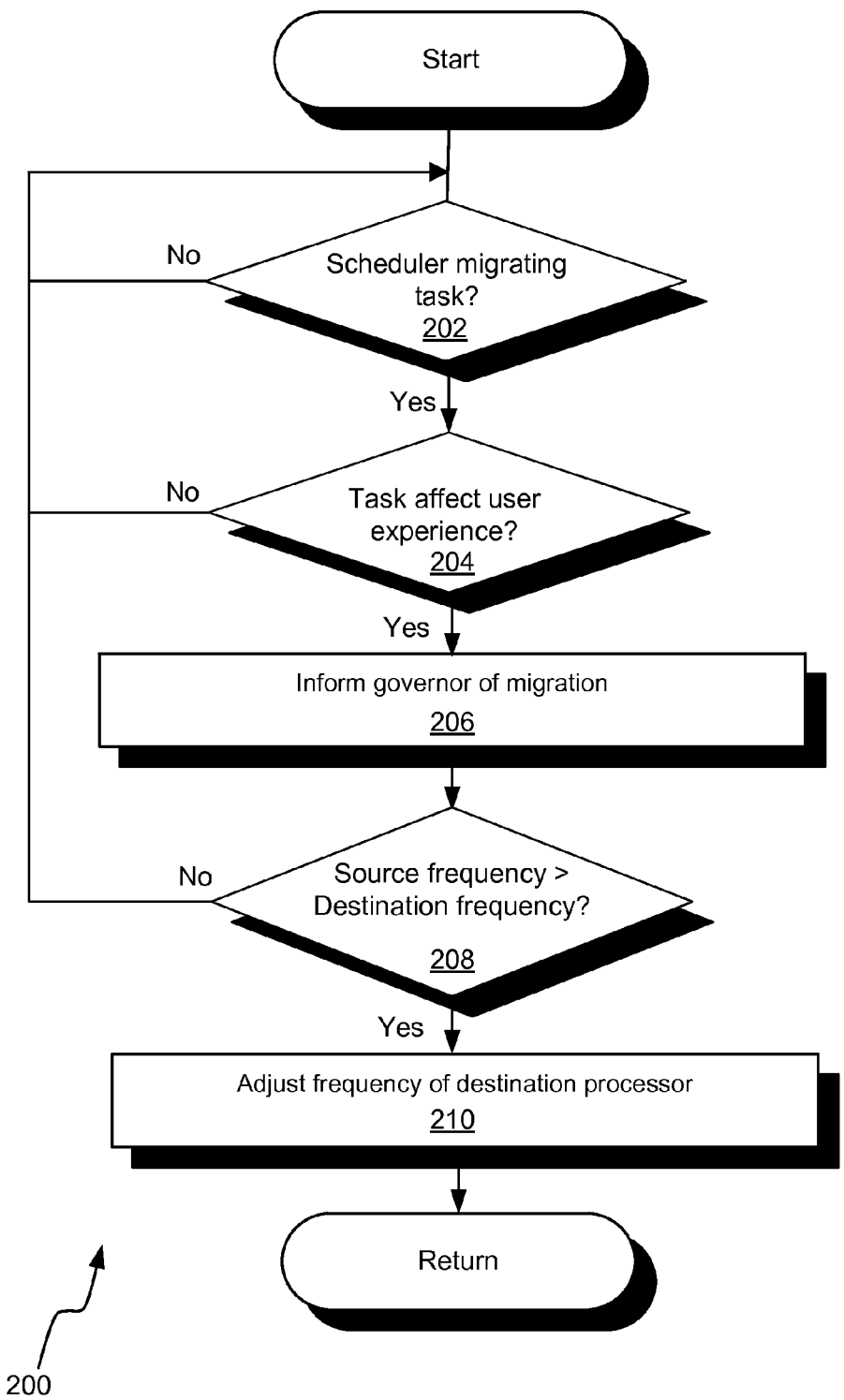
FIG. 2 is a flowchart depicting a method that may be carried out in connection with the embodiment depicted in FIG. 1.

While referring to FIG. 1, simultaneous reference is made to FIG. 2, which is a flowchart depicting a method that may be carried out in connection with the embodiment depicted in FIG. 1. As shown in FIG. 2, when the kernel scheduling component 110 is migrating a task from one processor to another (Block 202), and the task may affect an experience of the user (Block 204), the task migration reporting component 124 informs the governor 112 of the migration (Block 206). The governor 112 then compares the frequency of the source processor with the frequency of the destination processor to determine if the frequency of the source processor is greater than the frequency of the destination processor (Block 208). And if the frequency of the source processor is greater than the frequency of the destination processor (Block 208), then the frequency synchronization component 120 adjusts the frequency of the destination processor (Block 210). For example, the frequency of the destination processor may be adjusted to be substantially the same as the source processor or another sufficient frequency. In this way, when a task that may affect the user's experience is migrated from one processor to another, the execution of the task is not slowed down, and when tasks are not being migrated, the frequency of the processors may be individually tailored to their respective loads. Thus, embodiments disclosed herein enable a user's experience to be substantially unaffected and load balancing is carried out (by the kernel scheduling component 110). As used herein, maintaining the user experience is defined with respect to processors running at a level sufficient to meet the calls of the one or more applications 202 and to do so such that the user does not experience any perceptible slowing of the user equipment, degradation in graphics or audio, or any other degradation in performance that is humanly noticeable.

The adjustment of the frequency of the destination processor (Block 210) may be made in a variety of different ways. One potential adjustment may be scaling the frequency of the target processor to be a maximum frequency. Another adjustment is to set the frequency of the destination processor to the frequency of the source processor. Because the task (also referred to herein as a process) is moving to another processor operating at the same frequency, its execution should not be affected by the migration.

Yet another adjustment approach is a hybrid approach that utilizes a reference frequency (ref_freq). In this approach to frequency adjustment, if the frequency of the destination processor is less than the reference frequency, then the frequency of the destination processor is set to the reference frequency. If the frequency of the destination processor is greater than the reference frequency, then the frequency of the destination processor is synchronized with the frequency of the of the source processor. In this way, the hybrid approach ensures that the frequency of the destination processor is at least the reference frequency, which can be tuned to prevent the frequency of the destination processor from being too low to maintain the user experience. This hybrid approach is a generalization of the first two frequency adjustment solutions. By setting the reference frequency to the maximum frequency, the first adjustment solution is obtained. And by setting the reference frequency to the frequency of the source processor, this solution transforms to the second solution, which provides better power efficiency than the first solution.

It should be recognized that these proposed adjustments to the frequency of the destination processor (Block 210) are merely exemplary and that other frequency adjustment approaches are certainly contemplated. It should also be recognized that the particular frequencies of the processors will vary based upon the frequency capabilities of the processors.

Figure 3:
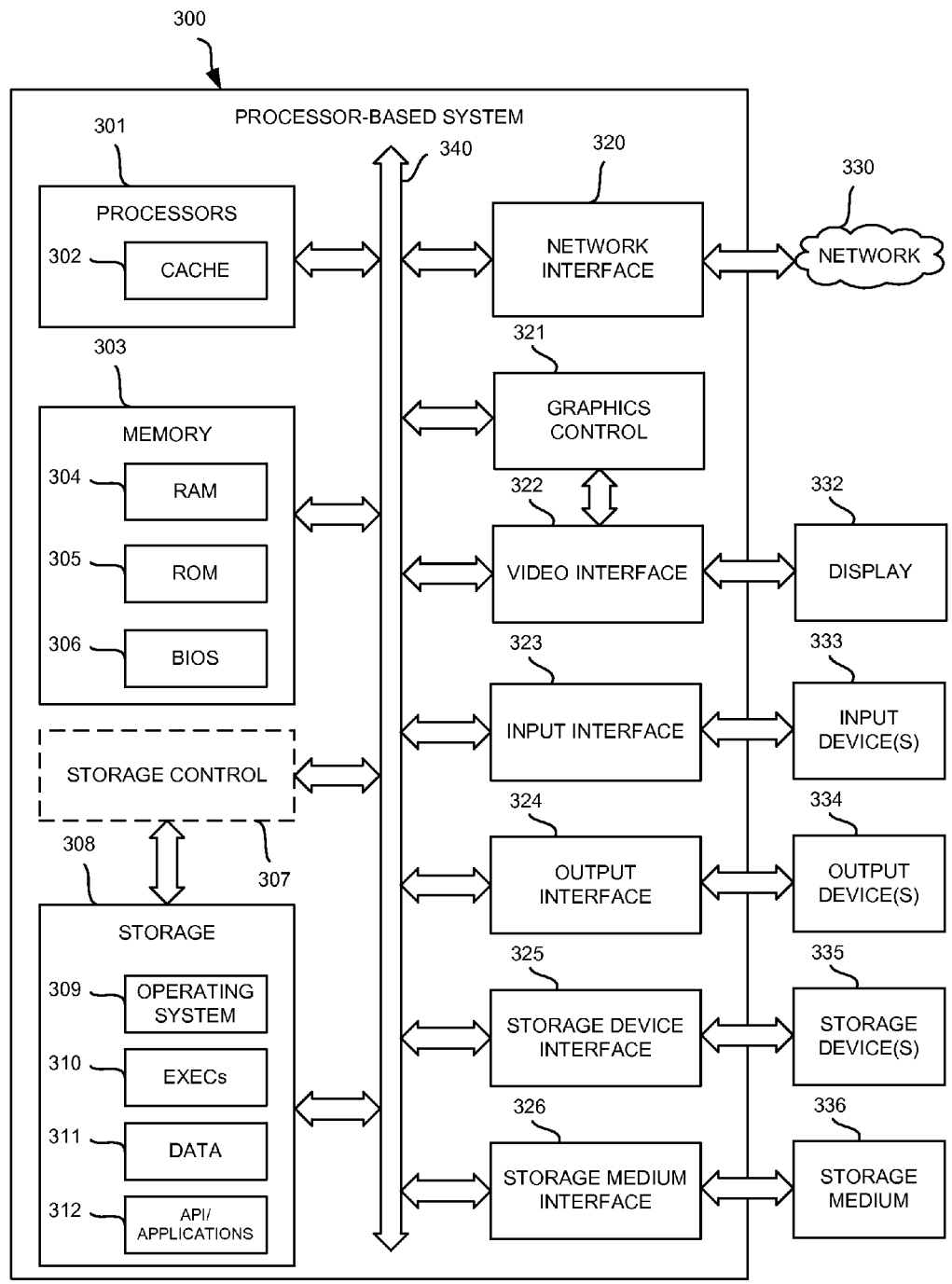
FIG. 3 is a block diagram depicting physical structures that may be utilized in connection with implementing the embodiments disclosed herein.

The systems and methods described herein can be implemented in a machine such as a processor-based system in addition to the specific physical devices described herein. FIG. 3 shows a diagrammatic representation of one embodiment of a machine in the exemplary form of a processor-based system 300 within which a set of instructions can execute for causing a device to perform or execute any one or more of the aspects and/or methodologies of the present disclosure. The components in FIG. 3 are examples only and do not limit the scope of use or functionality of any hardware, software, embedded logic component, or a combination of two or more such components implementing particular embodiments.

Processor-based system 300 may include processors 301, a memory 303, and storage 308 that communicate with each other, and with other components, via a bus 340. The bus 340 may also link a display 332 (e.g., touch screen display), one or more input devices 333 (which may, for example, include a keypad, a keyboard, a mouse, a stylus, etc.), one or more output devices 334, one or more storage devices 335, and various tangible storage media 336. All of these elements may interface directly or via one or more interfaces or adaptors to the bus 340. For instance, the various non-transitory tangible storage media 336 can interface with the bus 340 via storage medium interface 326. Processor-based system 300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processors 301 (or central processing unit(s) (CPU(s))) optionally contain a cache memory unit 302 for temporary local storage of instructions, data, or computer addresses. Processor(s) 301 are configured to assist in execution of processor-executable instructions. Processor-based system 300 may provide functionality as a result of the processor(s) 301 executing software embodied in one or more tangible processor-readable storage media, such as memory 303, storage 308, storage devices 335, and/or storage medium 336. The processor-readable media may store software that implements particular embodiments, and processor(s) 301 may execute the software. Memory 303 may read the software from one or more other processor-readable media (such as mass storage device(s) 335, 336) or from one or more other sources through a suitable interface, such as network interface 320. The software may cause processor(s) 301 to carry out one or more processes or one or more steps of one or more processes described or illustrated herein. Carrying out such processes or steps may include defining data structures stored in memory 303 and modifying the data structures as directed by the software.

The memory 303 may include various components (e.g., machine readable media) including, but not limited to, a random access memory component (e.g., RAM 304) (e.g., a static RAM "SRAM", a dynamic RAM "DRAM, etc.), a read-only component (e.g., ROM 305), and any combinations thereof. ROM 305 may act to communicate data and instructions unidirectionally to processor(s) 301, and RAM 304 may act to communicate data and instructions bidirectionally with processor(s) 301. ROM 305 and RAM 304 may include any suitable tangible processor-readable media described below. In one example, a basic input/output system 306 (BIOS), including basic routines that help to transfer information between elements within processor-based system 300, such as during start-up, may be stored in the memory 303.

Fixed storage 308 is connected bidirectionally to processor(s) 301, optionally through storage control unit 307. Fixed storage 308 provides additional data storage capacity and may also include any suitable tangible processor-readable media described herein. Storage 308 may be used to store operating system 309, EXECs 310 (executables), data 311, APV applications 312 (application programs), and the like. Often, although not always, storage 308 is a secondary storage medium (such as a hard disk) that is slower than primary storage (e.g., memory 303). Storage 308 can also include an optical disk drive, a solid-state memory device (e.g., flash-based systems), or a combination of any of the above. Information in storage 308 may, in appropriate cases, be incorporated as virtual memory in memory 303.

In one example, storage device(s) 335 may be removably interfaced with processor-based system 300 (e.g., via an external port connector (not shown)) via a storage device interface 325. Particularly, storage device(s) 335 and an associated machine-readable medium may provide nonvolatile and/or volatile storage of machine-readable instructions, data structures, program modules, and/or other data for the processor-based system 300. In one example, software may reside, completely or partially, within a machine-readable medium on storage device(s) 335. In another example, software may reside, completely or partially, within processor(s) 301.

Bus 340 connects a wide variety of subsystems. Herein, reference to a bus may encompass one or more digital signal lines serving a common function, where appropriate. Bus 340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Processor-based system 300 may also include an input device 333. In one example, a user of processor-based system 300 may enter commands and/or other information into processor-based system 300 via input device(s) 333. Examples of an input device(s) 333 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 333 may be interfaced to bus 340 via any of a variety of input interfaces 323 (e.g., input interface 323) including, but not limited to, serial, parallel, game port, USB, FIREWIRE, THUNDERBOLT, or any combination of the above.

In particular embodiments, when processor-based system 300 is connected to network 330, processor-based system 300 may communicate with other devices, specifically mobile devices and enterprise systems, connected to network 330. Communications to and from processor-based system 300 may be sent through network interface 320. For example, network interface 320 may receive incoming communications (such as requests or responses from other devices) in the form of one or more packets (such as Internet Protocol (IP) packets) from network 330, and processor-based system 300 may store the incoming communications in memory 303 for processing. Processor-based system 300 may similarly store outgoing communications (such as requests or responses to other devices) in the form of one or more packets in memory 303 and communicated to network 630 from network interface 320. Processor(s) 301 may access these communication packets stored in memory 303 for processing.

Examples of the network interface 320 include, but are not limited to, a network interface card, a modem, and any combination thereof. Examples of a network 330 or network segment 330 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology may be used.

Information and data can be displayed through a display 332. Examples of a display 332 include, but are not limited to, a liquid crystal display (LCD), an organic liquid crystal display (OLED), a cathode ray tube (CRT), a plasma display, and any combinations thereof. The display 632 can interface to the processor(s) 301, memory 303, and fixed storage 308, as well as other devices, such as input device(s) 333, via the bus 340. The display 332 is linked to the bus 340 via a video interface 322, and transport of data between the display 332 and the bus 340 can be controlled via the graphics control 321.

In addition to a display 332, processor-based system 300 may include one or more other peripheral output devices 334 including, but not limited to, an audio speaker, a printer, and any combinations thereof. Such peripheral output devices may be connected to the bus 340 via an output interface 324. Examples of an output interface 324 include, but are not limited to, a serial port, a parallel connection, a USB port, a FIREWIRE port, a THUNDERBOLT port, and any combinations thereof.

In addition or as an alternative, processor-based system 300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a processor-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, or hardware in connection with software. Various illustrative components, blocks, modules, circuits, and steps have been described above generally in terms of their functionality. Whether such functionality is implemented as hardware or hardware that utilizes software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A communication device comprising:
   a plurality of processors;
   a scheduling component to migrate tasks between the processors to balance a load that is processed by the plurality of processors;
   a governor component including:
      a frequency adjustment component to control a frequency of each of the processors; and
      a frequency synchronization component to detect when the scheduling component is migrating one of the tasks from a source processor to a destination processor and to increase, based upon a frequency of the source processor, a frequency of the destination processor from a frequency set by the frequency adjustment component.

2. The communication device of claim 1, wherein the scheduling component includes a task assessor that is configured to assess, before the scheduling component invokes the frequency synchronization component, whether a particular task that will be migrated will affect an experience of a user of the communication device.

3. The communication device of claim 1, wherein the plurality of processors are integrated within a single app processor.

4. The communication device of claim 1, wherein the scheduling component and the governor include hardware and software implemented at a kernel level.

5. A method for operating a plurality of processors on a computing device, the method comprising:
   executing one or more tasks on a corresponding one of the plurality of processors at a corresponding one of a plurality of frequencies;
   adjusting a frequency of each of the plurality of processors based upon work that each of the plurality of processors is performing;
   migrating a particular task from a source processor to a destination processor in connection with load balancing; and
   increasing a frequency of the destination processor if the frequency of the destination processor is below a frequency of the source processor.

6. The method of claim 5, wherein increasing the frequency of the destination processor includes increasing the frequency to a higher frequency that is selected from the group consisting of: the frequency of the source processor, a maximum frequency of the destination processor, and a reference frequency.

7. The method of claim 5, including:
   determining whether the particular task is in a foreground control group (cgroup); and
   maintaining the frequency of the destination processor if the particular task does not belong to the foreground cgroup.

8. The method of claim 5, including:
   rescheduling a next scheduled governor timer callback one full period in the future after increasing a frequency of the destination processor.

9. The method of claim 5, including:
   increasing the frequency of the destination processor without waiting for other scheduled adjustments to frequencies of the plurality of processors.

10. A non-transitory, tangible processor readable storage medium, encoded with processor readable instructions to perform a method for operating a plurality of processors on a communication device, the method comprising:
    executing each of one or more tasks on a corresponding one of the plurality of processors at a corresponding one of a plurality of frequencies;
    adjusting a frequency of each of the plurality of processors based upon work that each of the plurality of processors is performing;
    migrating a particular task from a source processor to a destination processor in connection with load balancing; and
    increasing a frequency of the destination processor if the frequency of the destination processor is below a frequency of the source processor.

11. The non-transitory, tangible processor readable storage medium of claim 10, wherein increasing the frequency of the destination processor includes increasing the frequency to a higher frequency that is selected from the group consisting of: the frequency of the source processor, a maximum frequency of the destination processor, and a reference frequency.

12. The non-transitory, tangible processor readable storage medium of claim 10, the method including:
    determining whether the particular task is in a foreground control group (cgroup); and
    maintaining the frequency of the destination processor if the particular task does not belong to the foreground cgroup.

13. The non-transitory, tangible processor readable storage medium of claim 10, the method including:
    rescheduling a next scheduled governor timer callback one full period in the future after increasing a frequency of the destination processor.

14. The non-transitory, tangible processor readable storage medium of claim 10, the method including increasing the frequency of the destination processor without waiting for other scheduled adjustments to frequencies of the plurality of processors.

* * * * *